(12) United States Patent
Eddy (10) Patent No.: US 10,232,762 B2
(45) Date of Patent: Mar. 19, 2019

(54) CONVERTIBLE CARGO HITCH AND HAMMOCK ASSEMBLY

(71) Applicant: Nicholas Gordon Eddy, Sidney, NE (US)

(72) Inventor: Nicholas Gordon Eddy, Sidney, NE (US)

(*) Notice: Subject to any disclaimer, the term of this patent is extended or adjusted under 35 U.S.C. 154(b) by 0 days.

(21) Appl. No.: 15/586,764

(22) Filed: May 4, 2017

(65) Prior Publication Data

US 2017/0320424 A1 Nov. 9, 2017

Related U.S. Application Data

(60) Provisional application No. 62/331,776, filed on May 4, 2016.

(51) Int. Cl.
*B60P 3/39* (2006.01)
*B60P 3/42* (2006.01)
*A45F 3/24* (2006.01)

(52) U.S. Cl.
CPC .................. *B60P 3/42* (2013.01); *A45F 3/24* (2013.01); *B60P 3/39* (2013.01)

(58) Field of Classification Search
CPC ...... B60P 3/39; B60P 3/38; B60P 3/36; B60P 3/42; A45F 3/24
USPC .................................................. 224/519–521
See application file for complete search history.

(56) References Cited

U.S. PATENT DOCUMENTS

| | | | |
|---|---|---|---|
| 5,465,883 A * | 11/1995 | Woodward | B60R 9/06 211/41.14 |
| 6,099,035 A * | 8/2000 | Garvin, III | B60R 9/06 224/486 |
| 6,354,286 B1 | 3/2002 | Davis | |
| 6,513,690 B1 | 2/2003 | Churchill | |
| 7,073,857 B1 * | 7/2006 | Bailey | A47C 3/0255 224/547 |
| 7,591,404 B2 | 9/2009 | LeDuc et al. | |
| 9,066,576 B1 * | 6/2015 | Stassinos | B60N 3/008 |
| 9,179,759 B1 * | 11/2015 | Turner | A45F 3/22 |
| 9,776,576 B1 * | 10/2017 | McDermott | B60R 11/00 |
| 9,861,180 B1 * | 1/2018 | Jungling | A45F 3/24 |
| 2004/0051290 A1 * | 3/2004 | Morgan | B60R 9/0426 280/769 |
| 2005/0242141 A1 * | 11/2005 | Zhang | B60R 9/06 224/499 |
| 2006/0151556 A1 * | 7/2006 | Eby | B60R 9/06 224/519 |
| 2008/0006666 A1 * | 1/2008 | Kerr | B60R 9/06 224/524 |

OTHER PUBLICATIONS

Screen captures from YouTube video clip entitled "Hammock Hitch," 4 pages, uploaded on Nov. 13, 2012 by user "Scott Oakes". Retrieved from Internet: <https://www.youtube.com/watch?v=Xw5LXR-W9nc>.*

* cited by examiner

*Primary Examiner* — Scott McNurlen
(74) *Attorney, Agent, or Firm* — Precipice IP PLLC; Angela J. Grayson (57) ABSTRACT

A convertible cargo carrier and hammock assembly, adapted to be removeably attached at a rear of a vehicle, said vehicle having a tubular open-ended, rearwardly extending hitch receiver, the assembly comprising.

18 Claims, 6 Drawing Sheets

CONVERTIBLE CARGO HITCH AND HAMMOCK ASSEMBLY

CROSS-REFERENCE TO RELATED APPLICATION/PRIORITY CLAIM

The present application claims the benefit of U.S. Provisional Application No. 62/331,776, filed May 4, 2016 and is hereby incorporated by reference.

TECHNICAL FIELD

The present disclosure relates to a convertible cargo carrier and hammock assembly. More specifically, the present invention relates to a convertible cargo carrier and hammock assembly designed to solve the need for natural supports which support a hammock, while providing a multifunctional platform that combines the transport means necessary of items for camping and outdoor recreational use.

BACKGROUND

Cargo carriers, portable hammock supports, and the like are well known for outdoor recreational use. However, known designs for cargo carriers and portable hammock supports suffer from various deficiencies, namely the lack of convenience, ease, and efficiency for multifunctional use.

For example, it is often difficult to find a suitable solution for addressing the efficiency and convenience of transporting outdoor recreational cargo, a safe suitable means for sleeping at a campsite, and a means for cooking while outdoors. For example, some campsite grounds are not suitable for sleeping because the ground is rocky or wet. In some instances when camping, sleeping higher is more enjoyable. The present solution eliminates the need for natural supports, thus solving the problem of finding a suitable location to hang one's hammock for sleeping outdoors. The present invention is also a multifunctional platform that combines the transport of necessary items needed for camping such as carrying cargo to haul camping gear, providing a charcoal grill for cooking, and providing means for hanging an apparatus needed for safely sleeping, such as a hammock.

A number of solutions have attempted to address the above problems. For example, U.S. Pat. No. 9,179,759 provides a convertible hammock for a vehicle or ground stand, however, the '759 apparatus does not provide for a single multifunctional apparatus that converts to transport cargo, provides a means for cooking, and provides a means for supporting a hammock for sleeping.

Other known solutions to the problem provide for a transportable means for cooking such as U.S. Pat. No. 7,591,404 which provides for a swingable apparatus which can be attachable to a vehicle for transporting a grill (cooking device). However, the '404 apparatus does not provide for a single apparatus that converts to transport cargo, provides a means for cooking, and provides a means for supporting hammock for sleeping. Further, the apparatus of the '404 patent is rather bulky to transport.

Consequently, there is a need for a convertible cargo carrier and hammock assembly apparatus that eliminates the need for natural supports to support a hammock, and further combines the necessary items for camping in a convenient, affordable, easy to assemble, multi-use tool. The present invention meets these needs and provides the added benefit that camping set up is much simplified, the invention can be used on a variety of vehicles (most any vehicle having a tubular open-ended, rearwardly extending hitch-receiver), and the modular design makes camping quick and easy.

SUMMARY OF THE DISCLOSURE

An embodiment of the invention provides a convertible cargo carrier and hammock assembly, adapted to be removeably attached at the rear of a vehicle, said vehicle having a tubular open-ended, rearwardly extending hitch receiver, the assembly comprising:

a support sleeve, wherein said support sleeve is hollow, and having opposed upper and lower surfaces and opposed front and rear surfaces;

a platform, operatively connected to the support sleeve, wherein said platform comprises a platform base having an upper and lower surface, and upstanding peripheral platform walls having an upper and lower surface, operatively connected to the base to define an open containment region;

an elongated shaft operatively connected and aligned along the center lower surface of the support sleeve and the platform wherein said elongated shaft is adapted for insertion into the hitch receiver of the vehicle in a disposition extending rearwardly from the support sleeve; and a plurality of support arms, wherein each said support arm having an upper end and a lower end, each said lower end of said support arm thereof is removeably connected to said support sleeve, and the upper end of said arm is adapted to support a hammock.

An embodiment provides the assembly, wherein the support sleeve is elongated.

An embodiment provides the assembly, wherein the support arms operatively connect into the hollow portion of the support sleeve.

An embodiment provides the assembly, wherein the support arms are detachably connected into the support sleeve at an angle of 138 degrees measured from the upper surface of the support sleeve.

An embodiment provides the assembly, wherein the support sleeve is comprised of 2 inch×2 inch 11-gauge steel tubing.

An embodiment provides the assembly, wherein the elongated shaft is comprised of 2 inch×2 inch 11-gauge steel tubing.

An embodiment of the invention provides, wherein the support arms are comprised of 1.5 inch×1.5 inch 11-gauge steel tubing.

An embodiment provides the assembly, wherein the peripheral platform walls are comprised of 2 inch 11-gauge angle iron.

An embodiment provides the assembly, wherein the platform base is comprised of expanded metal.

An embodiment provides the assembly, further comprises a plurality of grates, said grates having opposed upper and lower surfaces.

An embodiment provides the assembly, wherein the peripheral platform walls have a plurality of openings formed along the lower surfaces adapted to removeably receive at least one positioning bracket.

An embodiment provides the assembly, wherein the elongated shaft is configured having a securing means to secure at least one positioning bracket.

An embodiment provides the assembly, wherein the platform is configured having a support arm stop affixed to the upper surface of the peripheral platform walls.

An embodiment provides the assembly, wherein the platform is configured with a sheath affixed to the lower surface of the peripheral platform walls.

An embodiment provides the assembly, wherein the hammock is comprised of fabric.

An embodiment provides the assembly, wherein the hammock is comprised of parachute nylon fabric.

An embodiment provides the assembly, wherein the hammock is a double hammock.

An embodiment provides the assembly, wherein the hammock is a double hammock.

An embodiment provides the assembly, wherein the hammock is water resistant.

An embodiment of the invention provides a convertible cargo carrier and hammock kit, adapted to be removeably attached at a rear of a vehicle, said vehicle having a tubular open-ended, rearwardly extending hitch receiver, the kit comprising:
  a support sleeve, wherein said support sleeve is hollow, having opposed upper and lower surfaces, and opposed front and rear surfaces;
  a platform, operatively connected to the support sleeve, wherein said platform comprises a platform base having an upper and lower surface, and upstanding peripheral platform walls having an upper and lower surface, operatively connected to the base to define an open containment region;
  an elongated shaft operatively connected and aligned along the center lower surface of the support sleeve and the platform wherein said elongated shaft is adapted for insertion into the hitch receiver of the vehicle in a disposition extending rearwardly from the support sleeve;
  a plurality of support arms, wherein each said support arm having an upper end and a lower end, each said lower end of said arm thereof adapted to removeably connect to said support sleeve, the upper end of said arm adapted to support a hammock; a plurality of grates;
  at least one positioning bracket;
  a plurality of securing means; and
  the hammock.

An embodiment provides an assembly configured for transporting a bicycle.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

This disclosure describes various embodiments of an apparatus assembly can that be easily and quickly converted from a cargo carrier to a hammock support assembly and vice versa.

Figure 1:
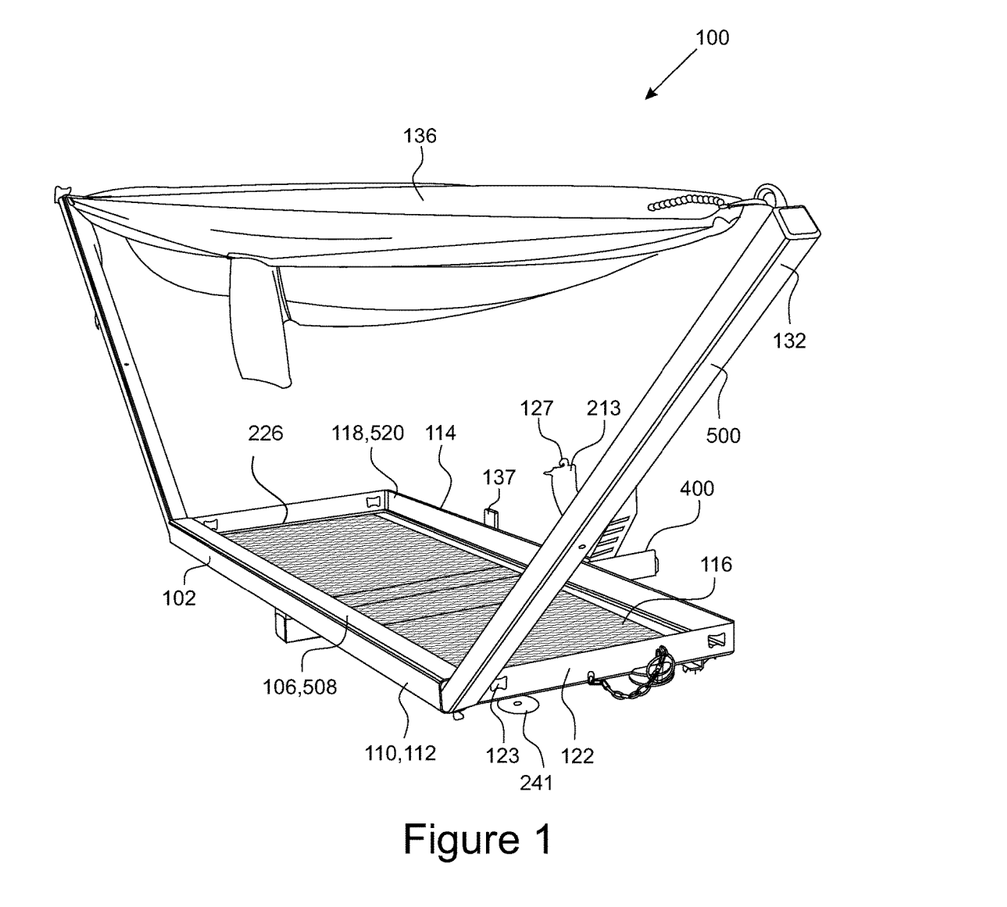
FIG. 1 is a front oriented perspective view of the convertible cargo carrier and hammock assembly assembled with hammock.

FIG. 1 provides an embodiment of an assembled convertible cargo carrier and hammock assembly 100. The invention provides the assembly 100 to removeably attach at the rear of a vehicle with a tubular open-ended hitch receiver, preferably a hitch receiver rearwardly extending. FIG. 1 shows the assembly 100 made of at least the following elements: a support sleeve 102, a platform 114, an elongated shaft 400, and a plurality of support arms 500. FIG. 1 also shows a hammock 136 in use with the assembly 100. The hammock 136 can be made of material known in the art, such as natural or synthetic fabric or rope. An embodiment of the invention provides a hammock made of synthetic parachute nylon fabric. An embodiment of the invention provides the hammock can be made of water resistant materials. An embodiment of the invention provides support a hammock or a double hammock.

The support sleeve 102 and elongated shaft 400 are both constructed of 2 inch×2 inch 11-gauge steel tubing, however one skilled in the art can appreciate alternative construction materials exist and can be employed without departing from the spirit and scope of the invention.

The support sleeve 102 also provides a hollow portion 104. This hollow portion 104 is designed to operatively connect the support arms to the support sleeve 102. The support sleeve 102 has opposed support sleeve upper surface 106 and support sleeve lower surface 508, and opposed support sleeve front surface 110 and support sleeve rear surface 112. The support sleeve 102 is operatively connected to the platform 114 along the support sleeve rear surface 112 by such means as welding, screws, rivets, or other suitable means. However, one skilled in the art can appreciate alternative construction materials exist and can be employed without departing from the spirit and scope of the invention.

FIG. 1 shows the platform 114 portion of the assembly 100. The platform 114 is comprised of a platform base 116 which is secured to upstanding peripheral platform walls at the peripheral platform wall upper surface 122. The platform base 116 has opposed platform base upper surface 118 and platform base lower surface 520. The peripheral platform wall upper surface 122 is operatively connected to the platform base lower surface 520 by such means as welding, screws, rivets and the like. The peripheral platform walls are constructed of 2 inch 11-gauge angle iron, and the platform base 116 is constructed of expanded metal and has opposing peripheral platform wall upper 122 and peripheral platform wall lower surface 524. An embodiment of the platform 114 is constructed to be 50 inches long×16.81 inches wide, having a platform base 49.25 inches long×16.375 inches wide. The platform base 116 is connected to the peripheral platform walls to provide an open containment region 226 for stowing cargo and grilling using grilling grates.

An embodiment of the invention provides the peripheral platform walls configured having a series of openings 123 which can be used to as a bottle opener and additionally used as cargo tether points which can be used to tether cargo using any suitable tethering means. Further, an embodiment of the invention provides the platform 114 configured to provide a support arm stop 137. The support arm stop 137 is designed to provide additional stabilization of the support arm 500 when not in use. One skilled in the art can appreciate alternative construction materials exist and can be employed without departing from the spirit and scope of the invention.

FIGS. 1, 2, 3, and 4, show the elongated shaft 400 portion of the assembly 100. The elongated shaft 400 is designed to be inserted into the hitch receiver of a vehicle in a disposition extending rearwardly from the support sleeve 102 at the vehicle hitch engagement position 703. The elongated shaft 400 has opposing upper surface 128 and lower surface 129. The elongated shaft 400 is operatively connected at the upper surface 128 to the support sleeve 102 and the platform 114 by such means as welding, screws, rivets and the like along the center lower surface of the support sleeve lower surface 508 and the platform lower surface 520. The elongated shaft 400 is constructed of 2 inch×2 inch 11-gauge steel tubing. The elongated shaft 400 is also configured to utilize a securing means 119 and 215 that secures the support arms 500 and positioning brackets 213 at the support arm fixture position 135, 135a and positioning bracket fixture position 121, 121a respectively. The manner of securing the support arm 500 and positioning bracket 213 onto the elongated shaft 400 can be any means known to one of reasonable skill in the art. An embodiment of the invention provides the support arms 500 be secured using a ⅜×5-inch carriage bolt and wing nut at the support arm fixture position 135 on the elongated shaft 400. An embodiment of the invention provides a positioning bracket 213 be secured using a ⅜×3-inch carriage bolt and wing nut at the positioning bracket fixture position 121 on the elongated shaft 400. An embodiment of the elongated shaft 400 provides an elongated shaft 400 which is 34 inches long.

FIGS. 1, 2, 3, 5, and 6 show the support arms 500 of the assembly 100. Each support arm 500 has a support arm upper end 132 and a support arm lower end 134. An embodiment provides the support arm is constructed of 1.5 inch×1.5 inch 11-gauge steel tubing. The support arm lower end 134 is constructed to removeably connect by insertion into the hollow portion 104 of the support sleeve 102 at an angle of 138 degrees. The support arm upper end 132 is designed to support and attach to a hammock 136. An embodiment of the invention provides a support arm upper end 132 formed with at least one hammock attachment point 125 that has either one or more openings formed in the support arm 500 or one or more D-rings affixed to the support arm 500 to removeably attach and support a hammock 136. One of reasonable skill in the art can appreciate the various means for attaching a hammock 136 to the support arms 500 without deviating from the spirit and scope of the invention.

Figure 2:
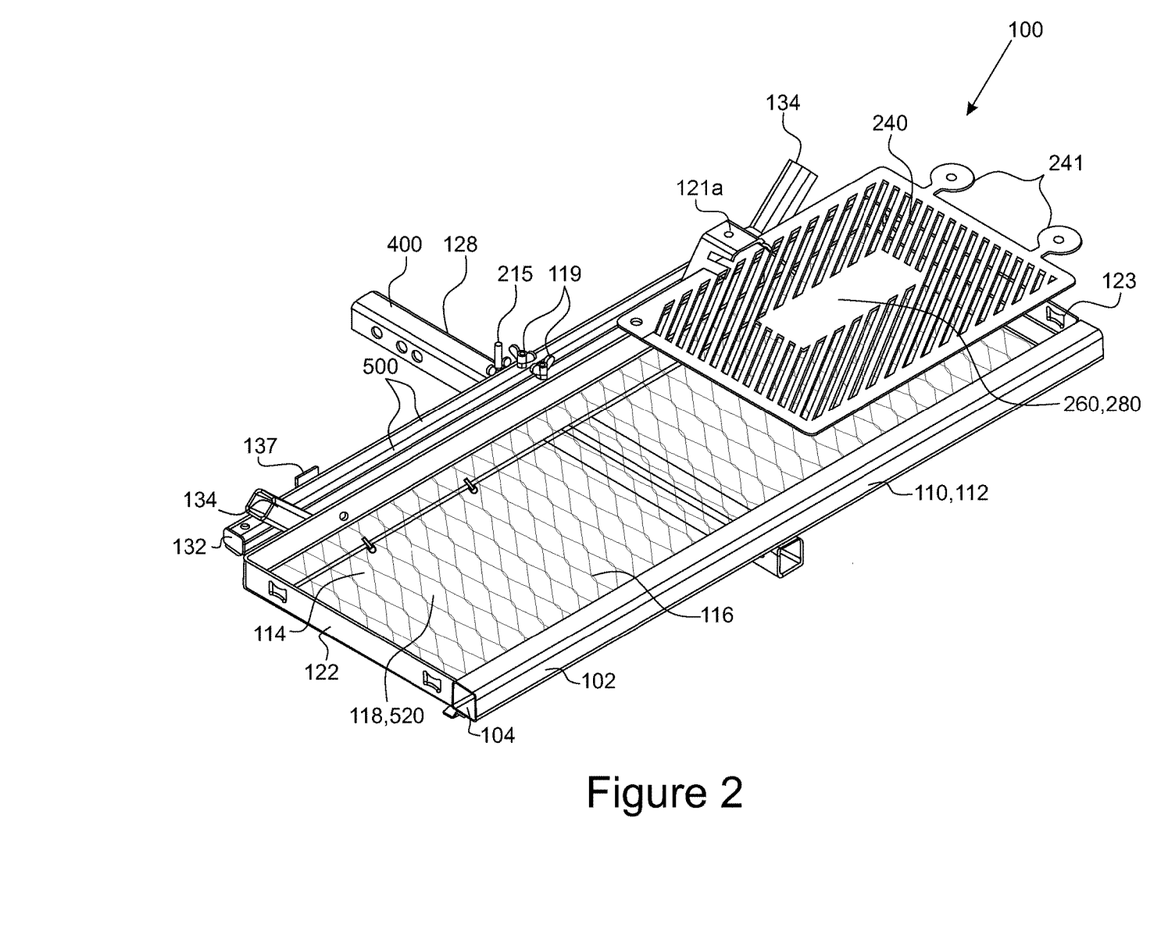
FIG. 2 is a top oriented perspective view of the convertible cargo carrier and hammock assembly with grate.
Figure 3:
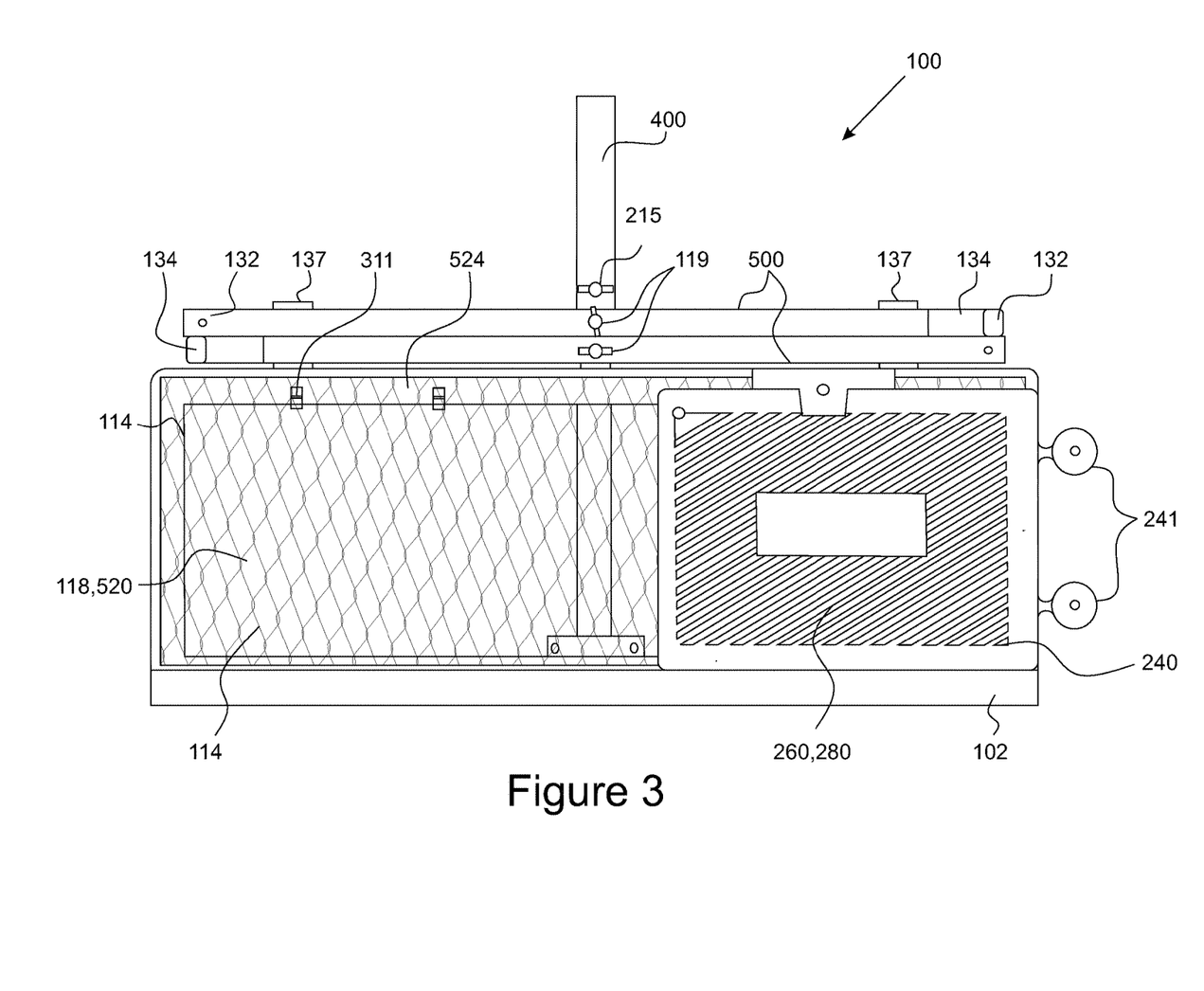
FIG. 3 is a top view of the convertible cargo carrier and hammock assembly with grate.
Figure 4:
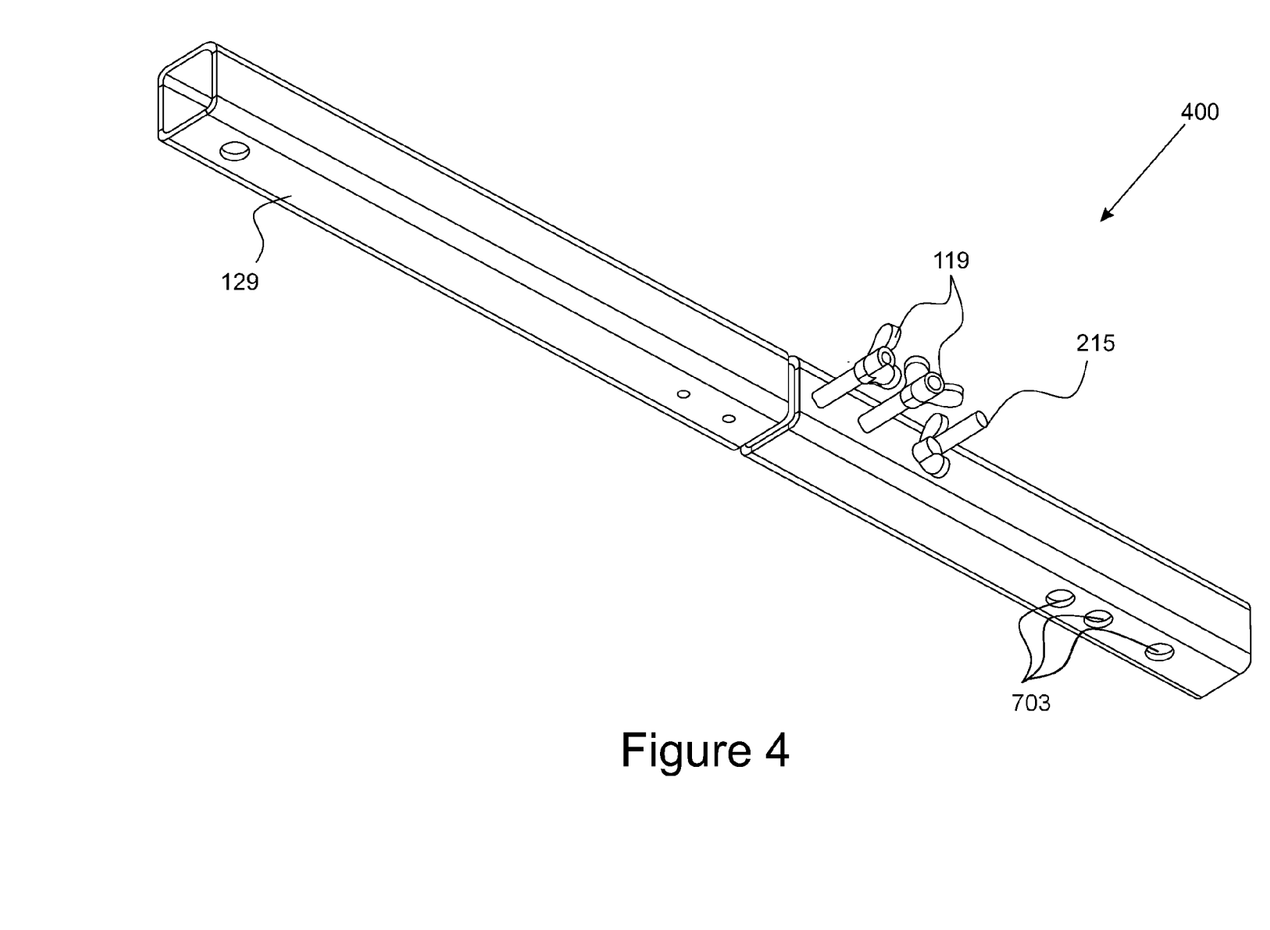
FIG. 4 is a top oriented perspective view of the elongated shaft and securing means.
Figure 5:
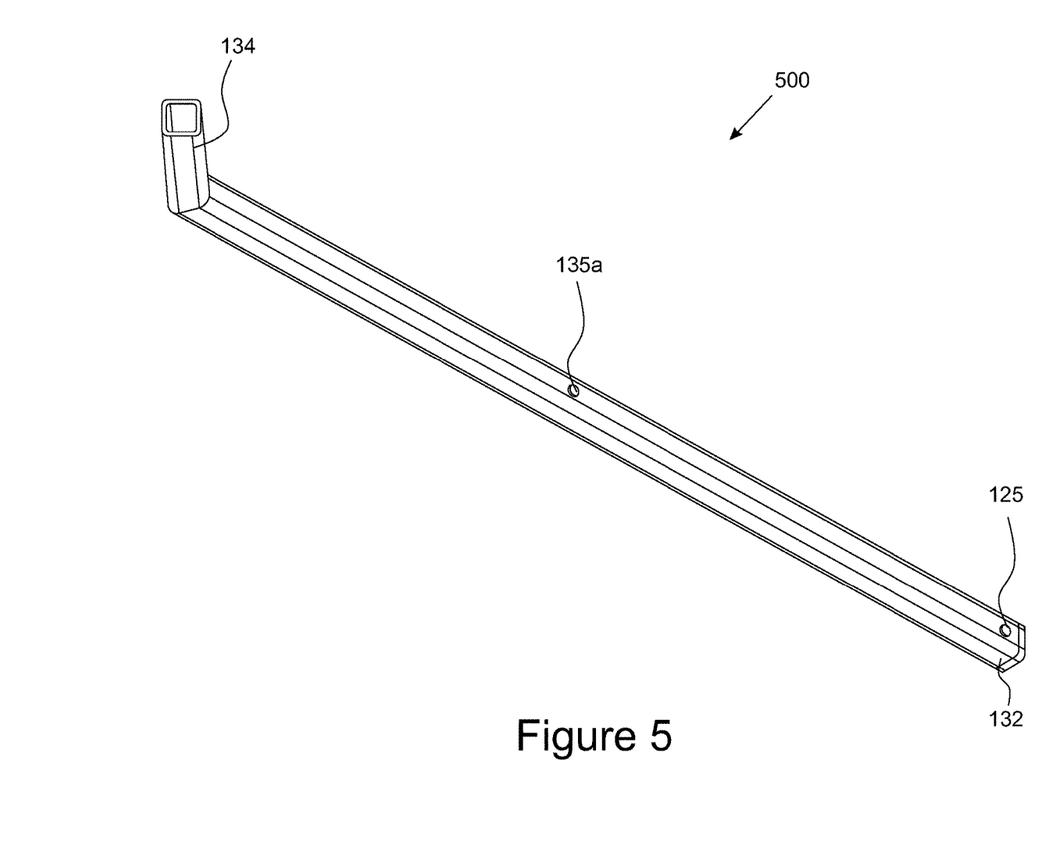
FIG. 5 is a top oriented perspective view a support arm.
Figure 6:
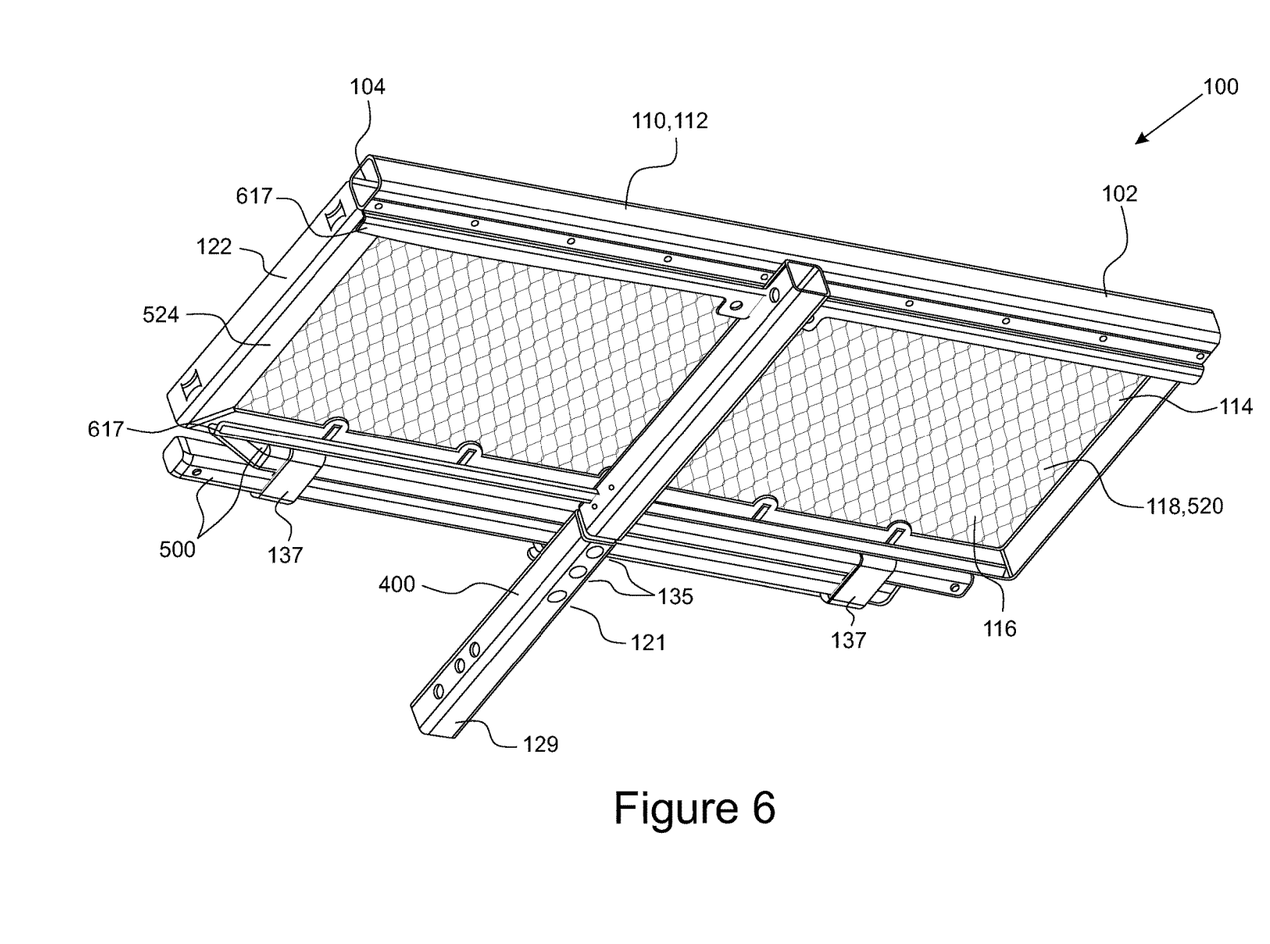
FIG. 6 is a bottom oriented perspective view the convertible cargo carrier and hammock assembly.

FIGS. 2 and 3 show an embodiment of the invention where the platform 114 is constructed to have a plurality of peripheral platform wall lower surface openings 311. The peripheral platform wall lower surface openings 311 are designed to secure a positioning bracket 213 onto the platform 114 for securing one or more grates for grilling. An embodiment of the invention provides a positioning bracket 213 which is 8 inches wide, 6.375 inches high and 2.15 inches deep. The positioning bracket 213 is configured having two positioning bracket protruding points 127 that are configured to operably connect in the peripheral platform wall lower surface openings 311.

The grates 240, having opposing upper 260 and lower surfaces 280, and are constructed of materials that one of skill in the art would use to cook food over a charcoal fire such as ½ inch 11-gauge angle iron, steel, cast iron, porcelain coated cast iron, stainless steel, and the like. An embodiment of the invention provides a grate 240 which is 21.5 inches long and 15.75 inches wide. An embodiment of the invention provides a grate 240 can be further constructed with at least one grate handle 214 affixed to the grate 240 to provide a grate 240 having a total dimension of 24.73 inches wide. The grate handle 241 can be constructed of ¼ inch steel rod or any suitable material capable of aiding in the handling of the grate 240. The grates 240 can be slidably engaged and stowed into a sheath 617 configured along the peripheral platform wall lower surface 524. A user may simply slide a grate 240 in and out of the sheath 617.

An embodiment of the invention provides that while a fully assembled, connectedly operable invention has been described, the invention can be sold in the various components parts to be assembled, thereby providing a convertible cargo carrier and hammock kit.

One of skill in the art can appreciate the numerous means of fabricating the invention. Once individual components are procured or cut to size any number of techniques can be used to operably connect the individual components. Suitable methods include welding all components, utilizing bolts, screws, rivets or another suitable means. One of skill in the art can appreciate the invention can be cut to different lengths or scaled proportionally without deviating from the spirit and scope of the invention.

It will be appreciated that the foregoing description provides examples of the disclosed assembly 100 and techniques for making the same. However, it is contemplated that other implementations of the disclosure may differ in some detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in any order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A convertible cargo carrier and hammock assembly, adapted to be removeably attached at a rear of a vehicle, said vehicle having a tubular open-ended, rearwardly extending hitch receiver, the assembly comprising:
   a support sleeve, wherein said support sleeve is hollow, and having opposed upper and lower surfaces and opposed front and rear surfaces;
   a platform, operatively connected to the support sleeve, wherein said platform comprises a platform base having an upper and lower surface, and upstanding peripheral platform walls having an upper and lower surface, operatively connected to the base to define an open containment region;
   a plurality of grilling grates having opposed upper and lower surfaces, slideably engaged and removably connected to the platform by a sheath affixed to the lower surface of the peripheral platform walls;
   an elongated shaft operatively connected and aligned along a center lower surface of the support sleeve and the platform wherein said elongated shaft is adapted for insertion into the hitch receiver of the vehicle in a disposition extending rearwardly from the support sleeve; and
   a plurality of support arms, wherein each said support arm having an upper end and a lower end, each said lower end of said support arm thereof is removeably connected to said support sleeve, and the upper end of said arm is adapted to support a hammock.

2. The assembly of claim 1, wherein the support sleeve is elongated.

3. The assembly of claim 1, wherein the support arms operatively connect into the hollow portion of the support sleeve.

4. The assembly of claim 1, wherein the support arms are detachably connected into the support sleeve at an angle of 138 degrees measured from the upper surface of the support sleeve.

5. The assembly of claim 1, wherein the support sleeve is comprised of 2 inch×2 inch 11-gauge steel tubing.

6. The assembly of claim 1, wherein the elongated shaft is comprised of 2 inch×2 inch 11-gauge steel tubing.

7. The assembly of claim 1, wherein the support arms are comprised of 1.5 inch×1.5 inch 11-gauge steel tubing.

8. The assembly of claim 1, wherein the peripheral platform walls are comprised of 2 inch 11-gauge angle iron.

9. The assembly of claim 1, wherein the platform base is comprised of expanded metal.

10. The assembly of claim 1, wherein the peripheral platform walls have a plurality of openings formed along the lower surface adapted to removeably receive at least one positioning bracket.

11. The assembly of claim 1, wherein the elongated shaft is configured having a securing means to secure at least one positioning bracket.

12. The assembly of claim 1, wherein the platform is configured having a support arm stop affixed to the upper surface of the peripheral platform walls.

13. The assembly of claim 1, wherein the hammock is comprised of fabric.

14. The assembly of claim 13, wherein the hammock is comprised of parachute nylon fabric.

15. The assembly of claim 1, wherein the hammock is a double hammock.

16. The assembly of claim 13, wherein the hammock is a double hammock.

17. The assembly of claim 1, wherein the hammock is water resistant.

18. A convertible cargo carrier and hammock kit, adapted to be removeably attached at a rear of a vehicle, said vehicle having a tubular open-ended, rearwardly extending hitch receiver, the kit comprising:
   a support sleeve, wherein said support sleeve is hollow, having opposed upper and lower surfaces, and opposed front and rear surfaces;
   a platform, operatively connected to the support sleeve, wherein said platform comprises a platform base having an upper and lower surface, and upstanding peripheral platform walls having an upper and lower surface, operatively connected to the base to define an open containment region, and wherein a sheath is affixed to the lower surface of the peripheral platform walls;
   an elongated shaft operatively connected and aligned along a center lower surface of the support sleeve and the platform wherein said elongated shaft is adapted for insertion into the hitch receiver of the vehicle in a disposition extending rearwardly from the support sleeve;
   a plurality of support arms, wherein each said support arm having an upper end and a lower end, each said lower end of said arm thereof adapted to removeably connect to said support sleeve, the upper end of said arm adapted to support a hammock;
   a plurality of grilling grates having opposed upper and lower surfaces which can slideably engage and removably connect to the platform by the sheath;
   at least one positioning bracket;
   a plurality of securing means; and
   the hammock.

* * * * *